United States Patent [19]

Lucek et al.

[11] B 4,000,999
[45] Jan. 4, 1977

[54] CENTRIFUGALLY CASTING HOLLOW GLASS BODY AROUND VAPOR SHIELD

[75] Inventors: John R. Lucek; Vernon B. Palen, both of Pittsfield, Mass.

[73] Assignee: General Electric Company, N.Y.

[22] Filed: Oct. 25, 1974

[21] Appl. No.: 517,858

[44] Published under the second Trial Voluntary Protest Program on February 17, 1976 as document No. B 517,858.

Related U.S. Application Data

[62] Division of Ser. No. 427,517, Dec. 27, 1973, abandoned.

[52] U.S. Cl. .................................. 65/49; 65/59 R; 65/71; 65/154; 65/155; 65/156; 65/302; 65/323
[51] Int. Cl.² ...................... C03B 9/00; C03B 7/00; C03C 27/02
[58] Field of Search ................ 65/49, 323, 47, 48, 65/139, 140, 59, 302, 71, 154, 155, 156, 59 R

[56] References Cited

UNITED STATES PATENTS

| | | | |
|---|---|---|---|
| 2,478,624 | 8/1949 | De Vine | 65/71 X |
| 3,376,186 | 4/1968 | Dovillard et al. | 65/49 X |
| 3,417,448 | 12/1968 | Kelley | 65/49 X |
| 3,783,094 | 1/1974 | Baum | 65/302 X |

Primary Examiner—S. Leon Bashore
Assistant Examiner—Frank W. Miga
Attorney, Agent, or Firm—Francis X. Doyle

[57] ABSTRACT

A vapor shield supporting ring is attached to the envelope of a vacuum device. The supporting ring is embedded in the inner wall of the envelope and extends into the interior of such envelope. A welding flange is mounted on the interior portion of the ring. The ring does not extend to the exterior wall of the envelope. To embed the ring in the envelope, the ring is suspended by a holding means such as a magnet, which is placed into the desired position within a centrifugal mold. The molten glass is poured into the mold and the mold is spun, thereby flowing the glass along the walls and surrounding the outer portion of the supporting ring. When the glass solidifies, the supporting ring is firmly embedded in the wall of the envelope.

4 Claims, 10 Drawing Figures

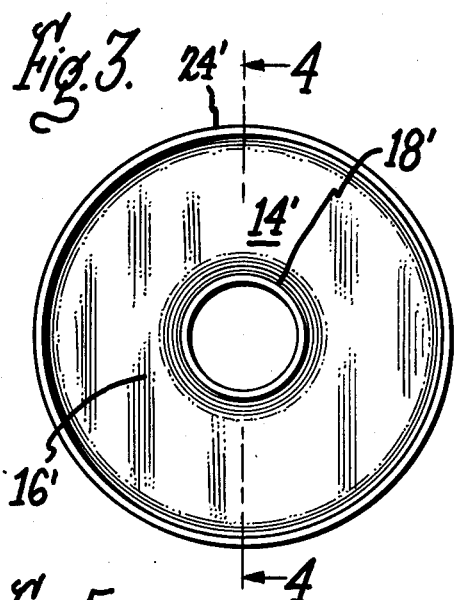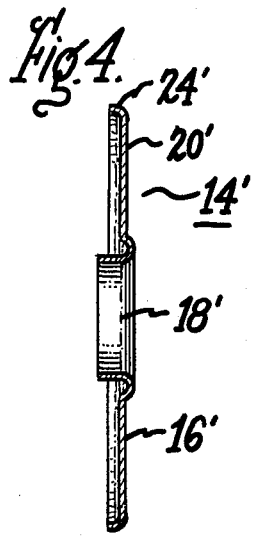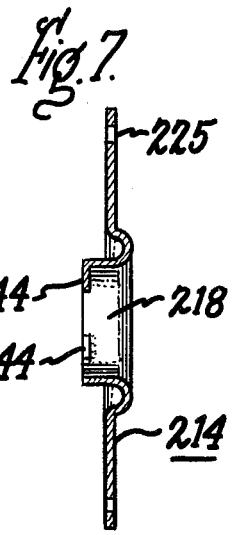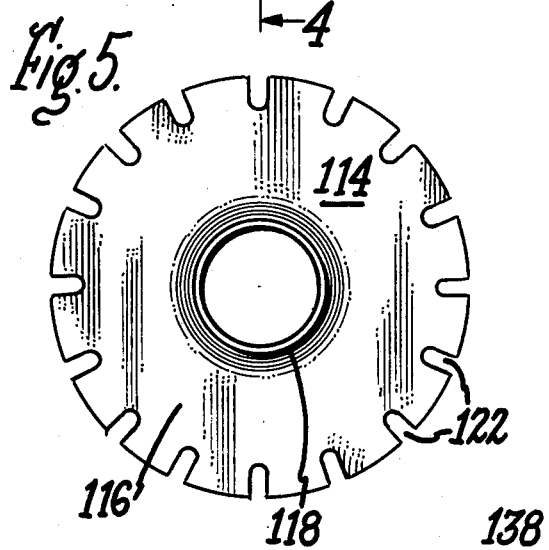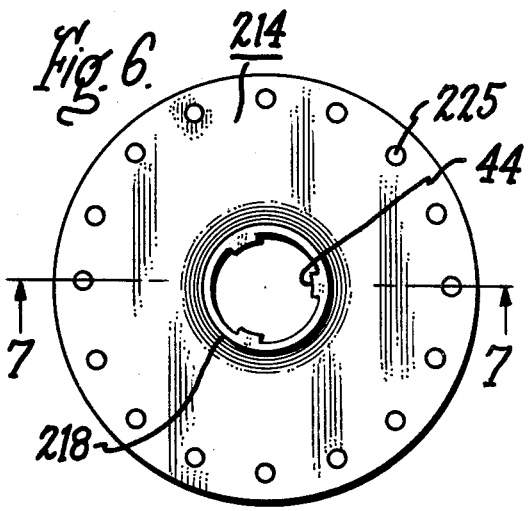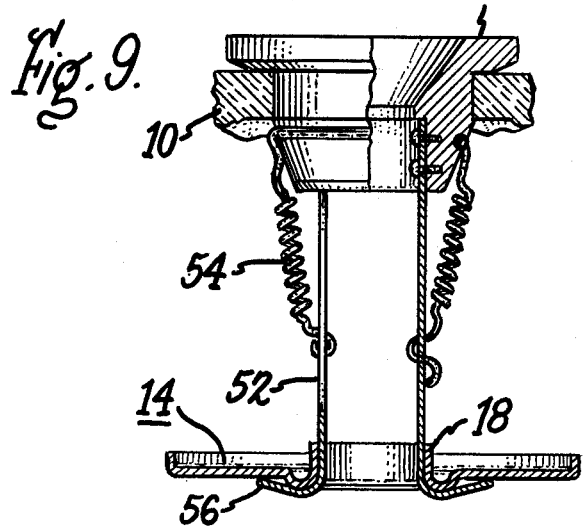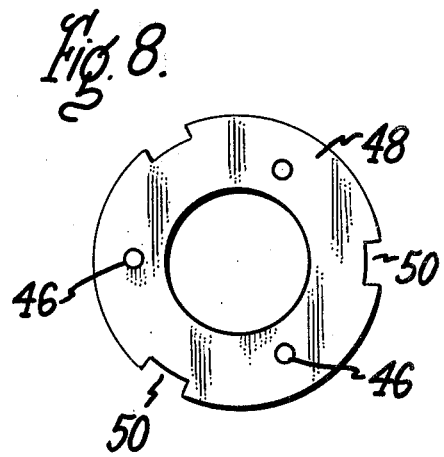

CENTRIFUGALLY CASTING HOLLOW GLASS BODY AROUND VAPOR SHIELD

This is a division of application Ser. No. 427,517, filed Dec. 27, 1973 now abandoned.

BACKGROUND OF THE INVENTION

This invention relates to vacuum envelopes, and more particularly, to a vapor shield supporting ring for such envelopes and to the method of installing such supporting rings.

In vacuum devices, such as circuit interrupters, the metallic vapors that are produced by arcing between the contacts often condense on the insulating envelope of the device. As is well understood, these vapors tend to form a metallic coating which may cause the device to fail. To protect these devices from such metal depositions on the envelope, metal shields are often provided about the contacts such as, for example, the shield disclosed in U.S. Pat. No. 3,048,681 in the name of George Polinko, Jr., and assigned to the same assignee as this invention. Often such shields are held in place by pins or the like extending through the envelope or embedded in the glass, in the manner taught by U.S. Pat. No. 3,048,681. However, the use of such pins leads to problems in obtaining proper alignment or orientation of the pin as well as increasing the cost of manufacture of such vacuum devices.

To overcome such problems, it is known to embed a support ring in the vacuum envelope during the casting or molding of such envelope. A ring so embedded is described and claimed in U.S. Pat. No. 3,376,186 in the name of Lucek et al one of the inventors herein, and assigned to the same assignee as this invention. One of the undesirable features of the support ring of U.S. Pat. No. 3,376,186 is that the ring protrudes beyond the exterior of the envelope. This extension of the edge of the ring beyond the exterior of the envelope is caused in part by the means of embedding of such ring in the envelope, as is described and claimed in U.S. Pat. No. 3,376,186. It is desirable to provide a support of mounting ring for a vapor shield, which is embedded in the envelope, extending into the interior thereof, but which does not extend to the outer surface of the envelope.

An object of this invention is to provide a vacuum envelope having a supporting ring embedded therein but which does not extend to the outer surface of the envelope.

A further object of this invention is to provide a supporting ring in the vacuum envelope wherein the glass of the envelope is continuous along the exterior circumference of such supporting ring.

SUMMARY OF THE INVENTION

In carrying out this invention in one form, a supporting ring is provided embedded in the wall of a glass envelope. The ring extends into the interior of such envelope, but does not extend to the outer wall or surface of the envelope. To embed the supporting ring in the envelope, the ring is suspended in a centrifugal mold in the desired position by a holding means, which grips the inner edge or portion of the ring. The centrifugal mold is charged with a predetermined amount of molten glass, before or after suspending the ring, and the mold is then spun on its axis. The molten glass flows up the wall of the mold, past the outer circumferential edge of the ring, surrounding such ring. The glass solidifies in the desired shape, firmly embedding the ring in the envelope.

The invention which is sought to be protected will be particularly pointed out and distinctly claimed in the claims appended hereto. However, it is believed that this invention and the manner in which its objects and advantages are obtained, as well as other objects and advantages thereof, will be better understood by reference to the following detailed description of preferred embodiments thereof particularly when considered in the light of the accompanying drawings.

BRIEF DESCRIPTION OF DRAWINGS

FIG. 3 is a top view of another form of support ring similar to that shown in FIG. 2;

FIG. 4 is a section view taken on the line 4—4 of FIG. 3;

FIG. 5 is a top view of still another form of support ring according to this invention;

FIG. 6 is a top view of still another form of support ring according to this invention;

FIG. 7 is a section view taken on the line 7—7 of FIG. 6;

FIG. 8 is an enlarged top view of a suspending device to be used with the support ring of FIGS. 6 and 7;

FIG. 9 is an elevation view of another form of ring suspending device according to a further embodiment of this invention.

DESCRIPTION OF THE PREFERRED EMBODIMENT

Figure 1:
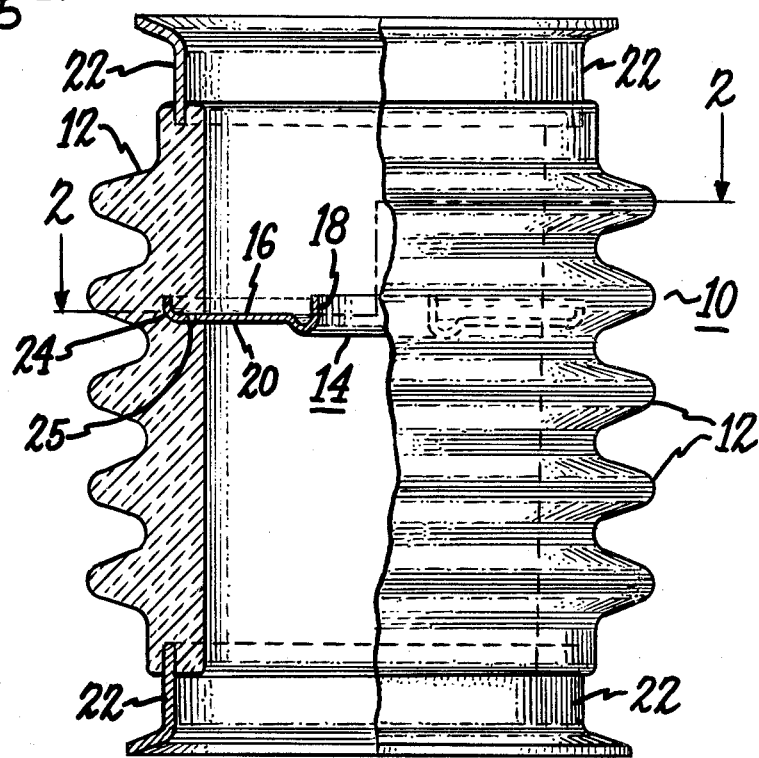
FIG. 1 is a front elevation view of a preferred form of glass envelope according to this invention, the left-hand portion being shown in section, taken on the line 1—1 of FIG. 2.
Figure 2:
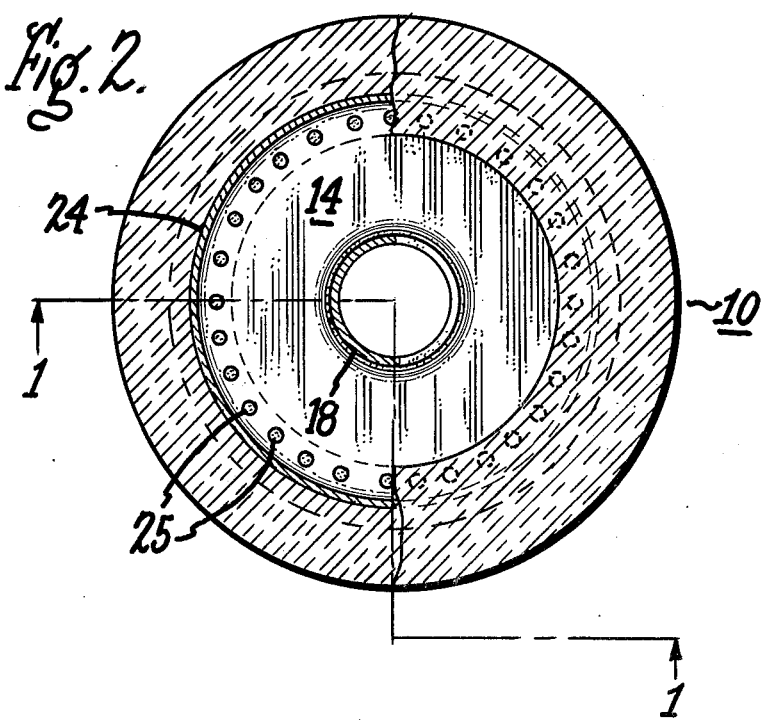
FIG. 2 is a section view taken on the line 2—2 of FIG. 1.

Referring now to the drawings in which like numerals are used to indicate like parts throughout the various views thereof and considering first FIGS. 1 and 2 there is shown a hollow glass envelope 10 according to the preferred embodiment of this invention. In the form shown, glass envelope 10 is shown as being provided with a plurality of petticoats 12, although the exterior surface could be smooth, if desired. A metal ring 14 is shown embedded in glass body 10, with its inner portion 16 extending into the hollow interior of envelope 10, and being provided with a welding flange 18. The welding flange 18 is provided to aid in dissipating the heat during welding of the shield and prevent damage to the envelope. The outer circumference 20 of ring 14 is shown as embedded in envelope 10, but not extending to the exterior wall of the envelope 10. As will be understood, ring 14 is provided to support a metallic shield (not shown) inside the envelope 10, when the envelope 10 is used for a vacuum switch or breaker.

In a preferred form of this invention, the support ring 14 is provided with an upturned flange 24 on outer portion 20, as well as a plurality of holes 25, to aid in embedding ring 14 in glass envelope 10.

Metallic end flanges 22 may be provided at opposite ends of envelope 10, embedded therein, as shown. As is well understood, end flanges 22 are used for attachment of the contacts and to seal the envelope 10 so that it will hold a vacuum. In one embodiment of this invention, the vapor shield secured to the support ring 14 may provide the end flange and be secured to one contact of the vacuum switch.

Referring now to FIGS. 3 and 4 of the drawing, there is shown a top and section view of another preferred form of a support ring 14' according to this invention. As is shown in FIGS. 3 and 4, the support ring 14' is provided with an inner portion 16' which includes the welding flange 18' similar to ring 14 of FIGS. 1 and 2. The outer portion 20' of the ring 14' is provided with an upturned flange 24' which as is shown in FIG. 1 is embedded in the envelope 10. However, as will be noted, support ring 14' does not include the holes in the outer portion. Of course, it will be understood that the rings shown in FIGS. 1, 2, 3 and 4 are the preferred forms of the support ring according to this invention. However, as will be more clearly understood as the description of the invention proceeds other forms of rings may be provided, if desired.

The envelope shown in FIGS. 1 and 2 may be made in many ways, for example, by casting in a conventional mold or by sealing the ring to one-half of a glass cylinder and then placing another glass cylinder on the upper portion of the ring and then fusing the parts together by heating. Also, the envelope 10 could be made by casting with plungers on opposite ends of the mold. The preferred form of the invention is made by centrifugal casting. While centrifugal casting of hollow insulation bushings is old in the art it is believed new in the art to centrifugally cast a bushing in which a metal member is cast into the wall and the metal member does not extend to the exterior of the wall as is shown in FIG. 1.

Figure 10:
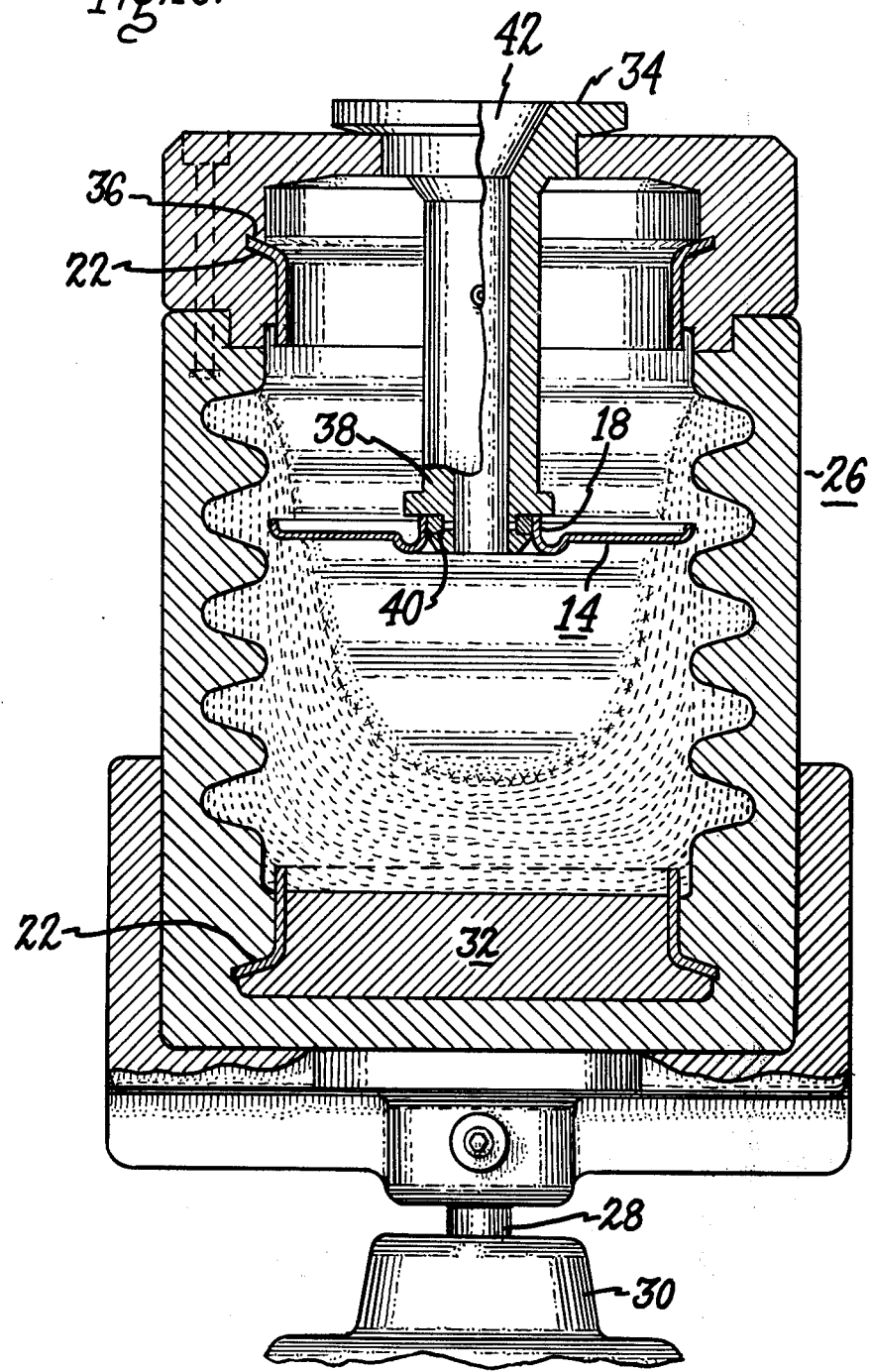
FIG. 10 is an elevation view, partly in section, showing a preferred apparatus for making the vacuum envelope shown in FIGS. 1 and 2.

FIG. 10 is an elevation view partly in section of an apparatus which may be used for forming the envelope of this invention. As is shown, a mold 26 is provided and is mounted for rotation about a vertical axis on a shaft 28 of an electric motor 30. In the preferred form of the invention, the mold is a split mold hinged along the plane passing through its axis, that is split into equal halves and hinged along the edge thereof. The mold is provided with means at the lower end thereof for mounting the end flange 22 as shown in FIG. 10. A block 32 of any suitable material, such as, for example, material corresponding to that of the mold 26, is inserted inside the lower end of the flange 22 for preventing it being filled with glass, as is shown. A cap 34 is placed on top of mold 26 and, in one form of the invention, upper end flange 22 is mounted on the exterior of cap 34. If desired, grooves 36 may be provided in mold 26 for holding the end flange 22 in the manner shown. The lower end of cap 34 extending into mold 26 is provided with a ring holding member 38 as is shown. The ring supporting or holding member 38 is provided with a plurality of magnetic devices indicated at 40. The magnetic devices 40 attract the welding flange 18 of supporting ring 14 and hold it securely in place within mold 26 as is clearly apparent in FIG. 10. In the prefered embodiment of the invention, four magnets 40 are utilized each placed 90° apart around the circumference of the ring holding member 38 and therefor support the supporting ring at the four points along the welding flange 18.

In the preferred embodiment of the invention, the cap 34, ring support member 38, carrying supporting ring 14 are placed in the mold, the mold is then closed with the supporting ring 14 suspended therein. A predetermined quantity of molten glass is then poured into the mold through the opening 42 of cap 34. As can be seen the opening 42 extends through the ring holding member 38. After the predetermined quantity of molten glass is poured into the mold, the mold is spun on its axis by the motor 30 causing the molten glass to flow outwardly and upwardly. The initial state of this motion causing the formation of a meniscus on the surface of the glass, but as the speed of rotation is increased, the glass continues to spread outward and upwardly along the walls of mold 10 thus flowing into the petticoat and around the outer edge of support ring 14. The glass flows upward and about the lower portion of the upper end flange until the glass assumes the shape shown, for example, in FIG. 1. At this point, the speed of rotation is stabilized until the glass solidifies. After solidifying, the mold may be opened and the glass body shown in FIG. 1 may be removed. The supporting ring 14 is held firmly in the glass body 10 and embedded in the walls thereof in the manner shown in FIG. 1.

Referring now to FIG. 5 of the drawing, another form of support ring is shown according to a further embodiment of this invention. In this form of support ring 114, the inner portion 116 is provided with a welding flange 118 similar to the support ring shown in FIG. 3. However, the exterior portion 120 of support ring 114 is provided with a plurality of slots 125 around the outer edge thereof. The slots 125 more readily enable the glass to flow up the side of the mold 26 and also serve to provide a further support for the ring 114 within the body 10.

Rather than use the magnetic holding means as is shown particularly in the preferred embodiment of FIG. 10, it is possible to hold the support ring in the desired position within the centrifugal mold 26 in the manner particularly shown in FIGS. 6, 7 and 8 of the drawing. As is shown in FIGS. 6 and 7, the inner welding flange 218 of the support ring 214 is provided with a plurality of flanges 44 opening in the support ring 14. A ring holding member 48, such as shown in FIG. 8, is provided and it is secured to the lower end of the ring holding member 38 in place of magnets 40, by means of bolts (not shown) through holes 46 in holding member 48. As is shown, the holding means 48 of FIG. 8 is provided with a plurality of slots 50, the slots 50 receiving flanges 44. After flanges 44 of support ring 214 are placed through the slots 50 support ring 214 may then be rotated slightly in order that the flanges 44 will rest on the support means 48. After the mold has been spun and the glass solidified then, as will be understood, the holding means 38 may be rotated slightly to bring the flanges 44 in line with notches 50 and removed leaving the support ring 214 in the desired position within the glass envelope 10. As will be understood, after the support ring is embedded in the vacuum envelope 10 the flanges 44 may be ground from the support ring 14 leaving the welding flange 18 smooth for reception of the vapor shield.

A further means of supporting the support ring 14 within the mold 26 is shown in FIG. 9. As is shown in FIG. 9, the support member 138 is provided with a plurality of spring mounted fingers 52 which are spring biased in an outward direction by means of springs 54. The support fingers 52 are provided with flanges 56 which, as will be understood fit through the opening in the support ring 14 and under the flange 18. The support fingers 52 hold the support ring securely in place within the mold during the centrifugal casting operation. After the glass solidifies and the envelope is in the form shown in FIG. 1 with the support ring 14 firmly embedded therein, the support fingers 52 are removed with the support member 138. In the preferred embodiment it would be desired to utilize three spring fingers 52 in order to properly center the support ring 14 in the mold 26.

As will be understood, for some vacuum interrupters, it may be desirable to have an external contact from the vapor shield. This is sometimes desired for the purpose of measuring the pressure inside the envelope, such as shown for example in U.S. Pat. No. 3,263,162 in the name of Lucek et al, one of the inventors herein. It will be understood that one or more pins could be provided on any of the support rings disclosed herein without departing from the disclosed invention. Of course, it will also be apparent that more than one support ring could be provided in the envelope 10, if desired. Obviously, as used herein the term glass can include any type of liquid material that can be cast into a solid vacuum envelope.

While there has been shown and described the present preferred embodiment of this invention together with various modifications thereof, it will be understood that various changes, such as above described, may be made wihtout departing from the spirit and scope of the invention. Therefore, it is intended by the appended claims to cover all such changes and modifications as fall within the spirit and scope of the invention.

We claim:

1. A method of embedding a support ring in a vacuum envelope comprising a centrifugal mold, a ring member having an internal welding flange, a cap for said mold, said cap being provided with a ring holding means extending into said mold, said ring holding means holding said support ring within said mold, charging said mold with a predetermined quantity of glass, and rotating said mold to form a glass envelope said glass extending beyond the outer circumference of said ring and firmly embedding said ring in said glass.

2. A method of embedding a support ring in a vacuum envelope as claimed in claim 1 in which said ring holding means is provided with a plurality of magnets holding said ring member by said welding flange.

3. A method of embedding a support ring in a vacuum envelope as claimed in claim 1 in which said ring holding means comprises a plurality of spring fingers holding said ring member at the center thereof.

4. A method of embedding a support ring in a vacuum envelope as claimed in claim 1 in which said ring member has a plurality of tabs and said ring holding means has a disk member secured thereto, said disk member having a like plurality of slots for receiving said tabs of said ring member, said ring member being twisted to secure it to said disk member.

* * * * *